United States Patent [19]
Broyhill

[11] Patent Number: 5,178,328
[45] Date of Patent: Jan. 12, 1993

[54] FOLDING BOOM FOR AGRICULTURAL SPRAYERS

[75] Inventor: Craig G. Broyhill, Dakota City, Nebr.

[73] Assignee: The Broyhill Company, Dakota City, Nebr.

[21] Appl. No.: 809,426

[22] Filed: Dec. 18, 1991

[51] Int. Cl.$^5$ .............................................. B05B 1/20
[52] U.S. Cl. .................................. 239/168; 239/167; 172/311
[58] Field of Search .............................. 239/164–169, 239/172, 175, 176; 172/311, 456

[56] References Cited

U.S. PATENT DOCUMENTS

| | | | |
|---|---|---|---|
| 2,602,684 | 7/1952 | Pinke | 403/53 |
| 2,619,379 | 11/1952 | Skifte | 239/168 |
| 2,770,493 | 11/1956 | Fieber | 239/168 |
| 3,395,503 | 8/1968 | Greenburg et al. | 52/114 |
| 3,866,834 | 2/1975 | Shannon | 239/167 |
| 4,133,391 | 1/1979 | Richardson et al. | 172/311 |
| 4,441,655 | 4/1984 | Blumhardt | 239/163 |
| 4,588,128 | 5/1986 | Broyhill et al. | 239/168 |
| 4,650,124 | 3/1987 | Connaughty et al. | 239/168 |

FOREIGN PATENT DOCUMENTS

| | | | |
|---|---|---|---|
| 3144309 | 5/1983 | Fed. Rep. of Germany | 239/167 |
| 3529286 | 2/1987 | Fed. Rep. of Germany | 239/167 |
| 3541130 | 5/1987 | Fed. Rep. of Germany | 239/167 |
| 2560533 | 9/1985 | France | 239/168 |
| 2105962 | 4/1983 | United Kingdom | 239/166 |

Primary Examiner—Andres Kashnikow
Assistant Examiner—Karen B. Merritt
Attorney, Agent, or Firm—Zarley, McKee, Thomte, Voorhees & Sease

[57] ABSTRACT

An agricultural sprayer comprising a wheeled frame having a spray tank thereon for pumping chemicals or the like to the spray nozzles on the various boom sections. An inner boom section, intermediate boom section, and outer boom section are provided at each side of the main frame of the sprayer with the boom sections being capable of being folded from a horizontally disposed field position to a folded transport position. When the sprayer is in the transport position, the components of the sprayer will have a width and height such that the sprayer may pass through the door opening of a building.

4 Claims, 5 Drawing Sheets

5,178,328

FOLDING BOOM FOR AGRICULTURAL SPRAYERS

BACKGROUND OF THE INVENTION

This invention relates to a folding boom for use with agricultural sprayers.

Agricultural sprayers are normally mounted on tractors, trucks or trailers and usually include boom assemblies which extend laterally from opposite sides of the truck or trailer. In the conventional sprayers, the boom assembly generally comprises at least inner and outer boom sections pivotally secured together so that the boom sections may be folded from a horizontal field position to a transport position.

Modern farming practices dictate that the sprayer have a field width great enough to cover a large area of the field. However, as the width of the sprayer increases, it becomes more difficult to fold the sprayer to a transport position. The folding problem is made even more difficult when it is desired to store the sprayer in a building since it is not possible to move most large sprayers through the door opening.

It is therefore a principal object of the invention to provide an improved folding sprayer.

A further object of the invention is to provide a folding agricultural sprayer which has a large spraying width but which may be folded in a unique manner so as to permit the sprayer to pass through the door opening of a building.

Yet another object of the invention is to provide a folding agricultural sprayer which may be easily and conveniently moved between a field position and transport position and vice versa.

These and other objects will be apparent to those skilled in the art.

SUMMARY OF THE INVENTION

Figure 1:
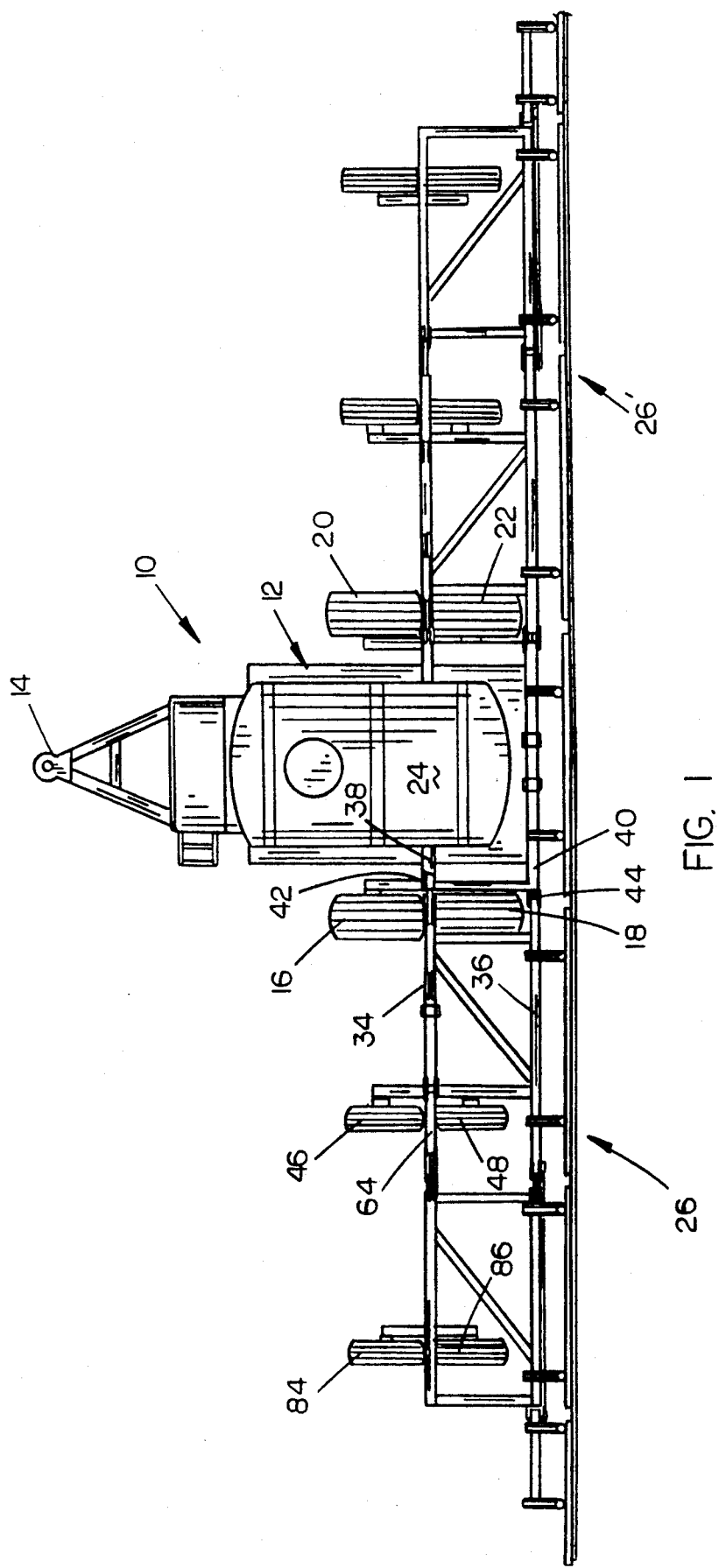
FIG. 1 is a top view of the sprayer of this invention.
Figure 2:
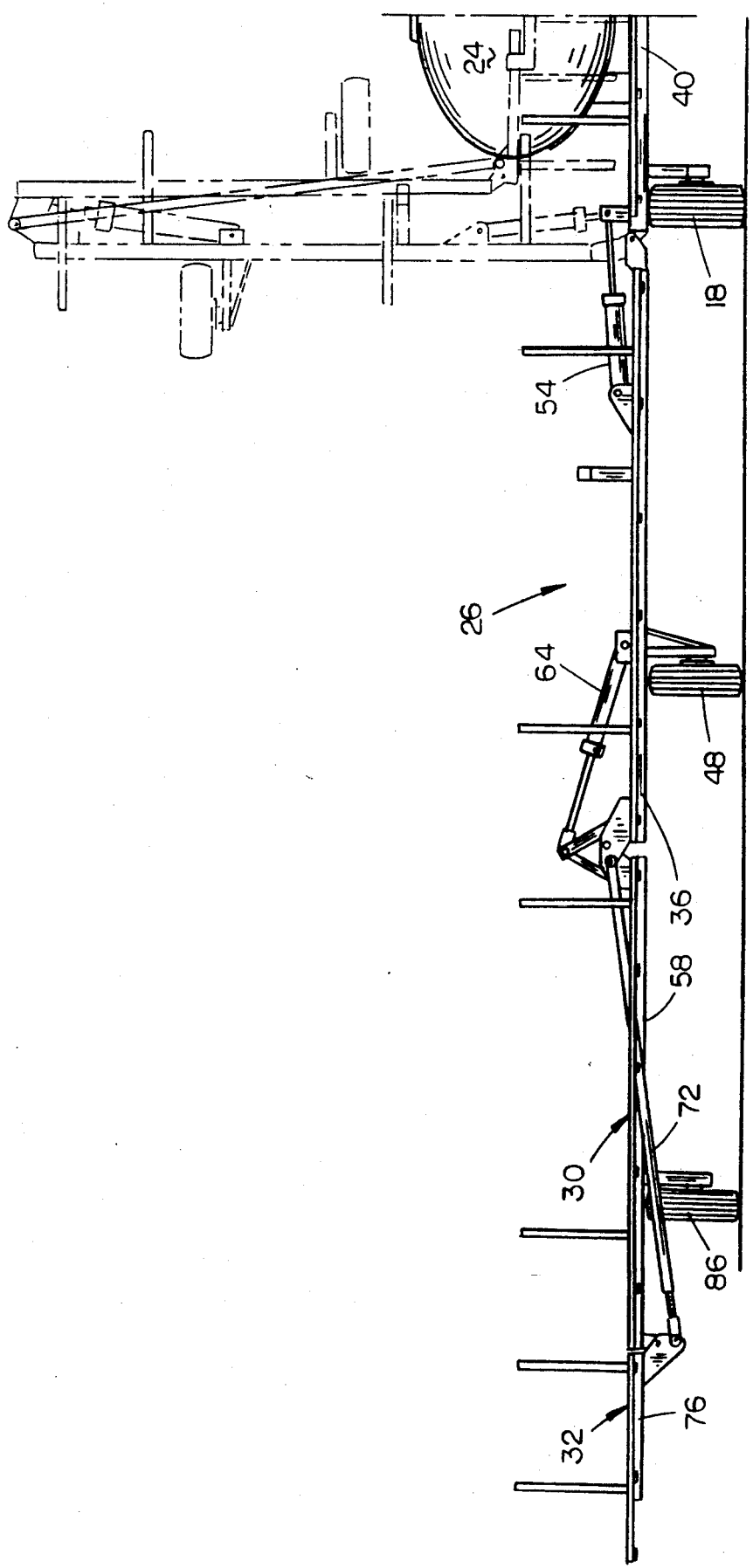
FIG. 2 is a rear view of one side of the sprayer with the broken lines indicating the position of the boom sections when in their transport position.

The folding agricultural sprayer of this invention comprises a wheeled frame means having rearward and forward ends and opposite sides. The wheeled frame means has a hitch provided thereon to enable the sprayer to be pulled by a tractor or the like. A spray tank is mounted on the wheeled frame means for containing chemicals or the like. A pair of boom assemblies are mounted at the opposite sides of the wheeled frame means and normally extend horizontally laterally outwardly therefrom. Each of the boom assemblies comprises an inner boom section, an intermediate boom section and an outer boom section. The inner end of each of the inner boom sections is pivotally secured to one side of the wheeled frame means and may be moved from a horizontally disposed field position to a vertically disposed transport position. The inner end of each of the intermediate boom sections is pivotally connected to the outer end of an associated inner boom section and is pivotally moveable about a horizontal axis approximately 180° so that it may be moved from a substantially horizontally disposed field position to a substantially horizontally disposed transport position overlying the associated inner boom section. Each of the outer boom sections is pivotally connected to the outer end of an associated intermediate boom section and is automatically pivoted approximately 90° with respect to the associated intermediate boom section as the intermediate boom section is pivotally moved from its field position to its transport position.

In use, assuming that the sprayer is in its field position, the sprayer is moved from its field position to its transport position by first folding the intermediate boom sections so that they overly or are positioned on top of the inner boom sections. As the intermediate boom sections are pivotally moved to a position over the intermediate boom sections, the outer boom sections are automatically pivotally moved approximately 90° with respect to the intermediate boom sections. When the intermediate boom sections have been positioned over the inner boom sections, the inner boom sections are then pivotally moved upwardly so that the sprayer will have a fairly narrow width and a fairly short heighth to enable the sprayer to pass through doorways or the like.

DESCRIPTION OF THE PREFERRED EMBODIMENT

The sprayer of this invention is referred to generally by the reference numeral 10. As seen in the drawings, sprayer 10 is illustrated as being mounted on a trailer but it should be understood that the sprayer could be mounted on a truck or the like if so desired.

In the preferred embodiment, sprayer 10 includes a wheeled frame means 12 having a hitch 14 at its forward end to enable the sprayer to be pulled by a tractor or the like. Wheels 16 and 18 are provided at one side of the wheeled frame means while wheels 20 and 22 are provided at the other side of the wheeled frame means. Spray tank 24 is mounted on the wheeled frame means 12 and would have the associated pumps, etc. to enable the chemicals to be supplied to the nozzles on the various boom sections.

Boom assembly 26 is positioned at one side of the wheeled frame means 12 while boom assembly 26' is positioned at the opposite side of the wheeled frame means 12. Inasmuch as boom assemblies 26 and 26' are identical, only boom assembly 26 will be described in detail with "'" indicating identical structure on boom assembly 26'.

Boom assembly 26 includes an inner boom section 28, intermediate boom section 30, and outer boom section 32. Inner boom section 28 includes a pair of horizontally disposed frame members 34 and 36 which are pivotally connected to frame members 38 and 40 of wheeled frame means 12 at 42 and 44 so that inner boom section 28 may be pivotally moved from the field position of FIG. 3 to the transport position of FIG. 5. A pair of wheels 46 and 48 are mounted on the underside of inner boom section 28 to support the same when the sprayer is being used in the field. Inner boom section 28 includes a spray bar 50 having a plurality of spray nozzles 52 mounted thereon. Hydraulic cylinder 54 is connected at its base end to inner boom section 28 and is pivotally connected at its rod end to wheeled frame means 12 to enable the inner boom section 28 to be moved between its field and transport positions and vice versa.

Figure 8:
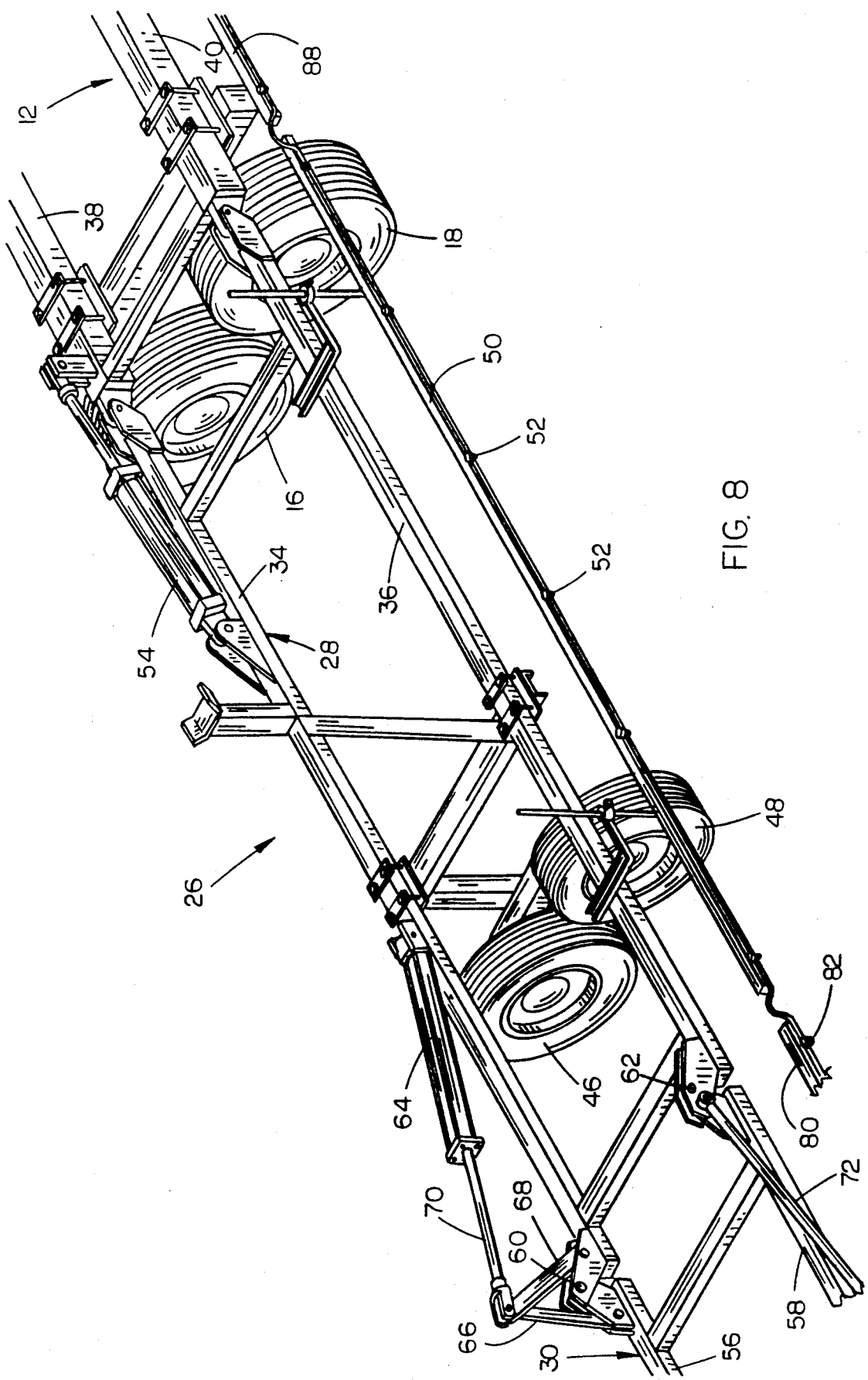
FIG. 8 is a partial rear perspective view of the sprayer.

Intermediate boom section 30 includes a pair of frame members 56 and 58 which are pivotally connected to the outer ends of frame members 34 and 36 of boom section 28 at 60 and 62, respectively. Hydraulic cylinder 64 is pivotally connected at its base end to frame member 34 and is pivotally connected at its rod end to links 66 and 68 as seen in FIG. 8. Thus, extension of rod 70 of hydraulic cylinder 64 will cause the intermediate boom section 30 to be pivoted from its transport position to its field position. Conversely, retraction of the rod 70 of hydraulic cylinder 64 will cause intermediate boom section 30 to be pivoted from its field position to its transport position. Link 72 is pivotally connected to the pivotal connection of boom section 28 and boom section 30 as seen in FIG. 8 and is pivotally connected at its outer end to bracket 74 which is secured to frame member 76 of outer boom section 32. Intermediate boom section 30 is provided with a spray bar 80 having nozzles 82 provided thereon. (As seen in the drawings, intermediate boom section is supported by a pair of wheels 84 and 86.)

Figure 4:
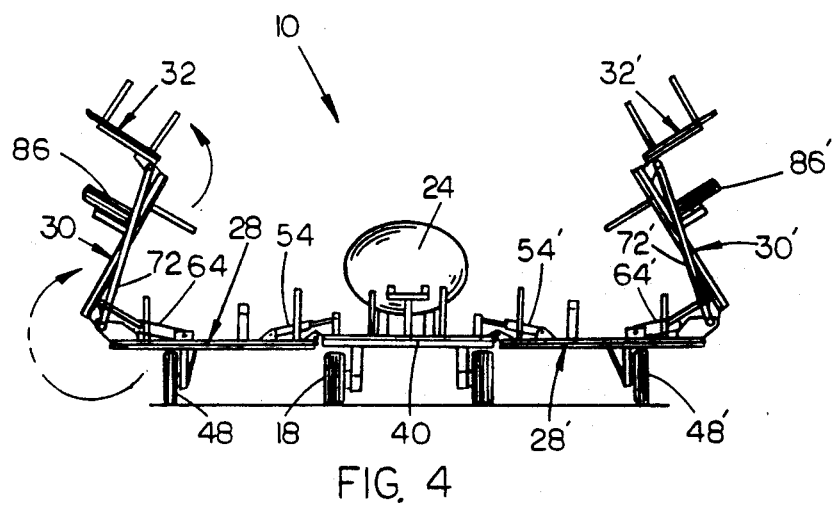
FIG. 4 is a view similar to FIG. 3 except that the intermediate and outer boom sections are being pivoted to their transport positions.
Figure 7:
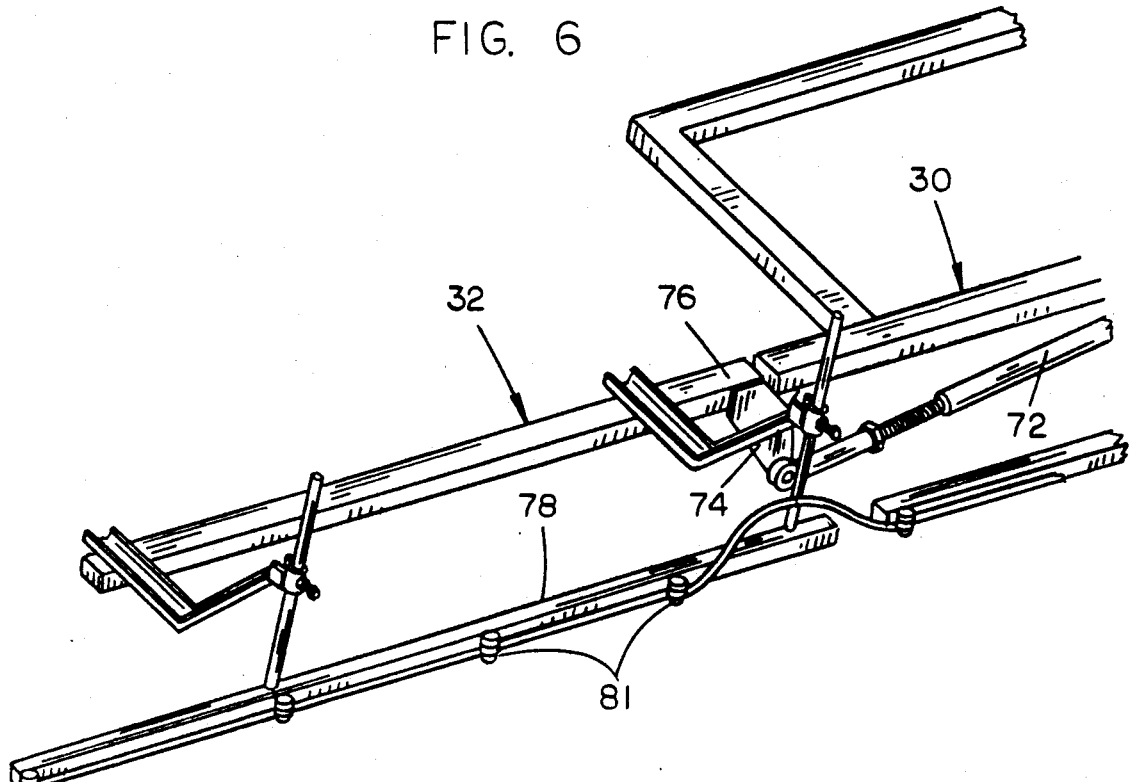
FIG. 7 is a partial perspective view illustrating the connection of an outer boom section to an inner boom section.

Outer boom section 32 is pivotally connected to the outer end of boom section 30 so as to be pivoted from the horizontal field position of FIG. 7 to the folded position illustrated in FIG. 4 as intermediate boom section 30 is folded to its transport position. The link 72 automatically causes outer boom section 32 to be pivoted relative to boom section 30 as boom section 30 is being pivoted relative to boom section 28. Outer boom section 32 is also provided with a spray bar 78 having nozzles 81 provided thereon.

Figure 3:
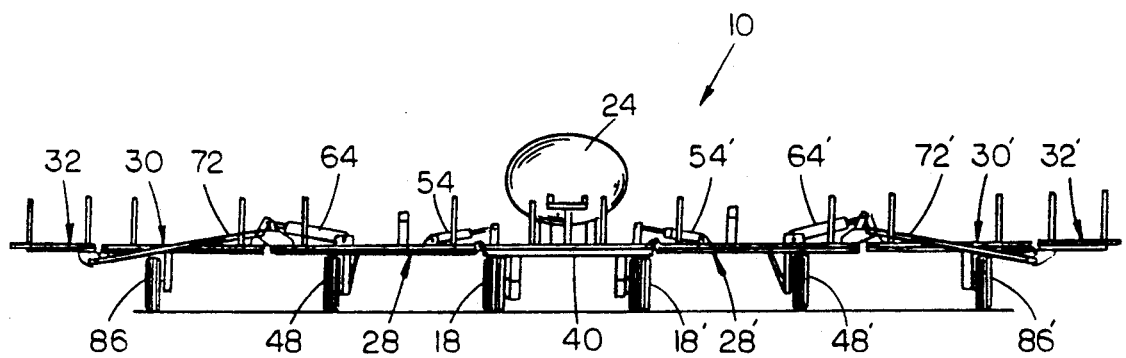
FIG. 3 is a rear view illustrating the sprayer of this invention in a field position.

FIGS. 1 and 3 illustrate the sprayer in its field position. It can be seen that the sprayer will have a great width due to the fact that three boom sections are provided at each of the opposite sides of the main spray bar 88. When it is desired to move the sprayer to its transport position, hydraulic cylinders 64 and 64' are retracted to cause the intermediate boom sections 30 and 30' to be moved from the position of FIG. 3 until the intermediate boom sections 30 and 30' are positioned on top of inner boom sections 28 and 28', respectively. As the intermediate boom sections 30 and 30' are being moved to a position overlying the inner boom sections 28 and 28', respectively, outer boom sections 32 and 32' will be pivoted approximately 90° with respect to boom sections 30 and 30' as illustrated in FIG. 4. As previously stated, boom sections 32 and 32' are automatically moved to their folded position by means of the links 72 and 72', respectively.

Figure 5:
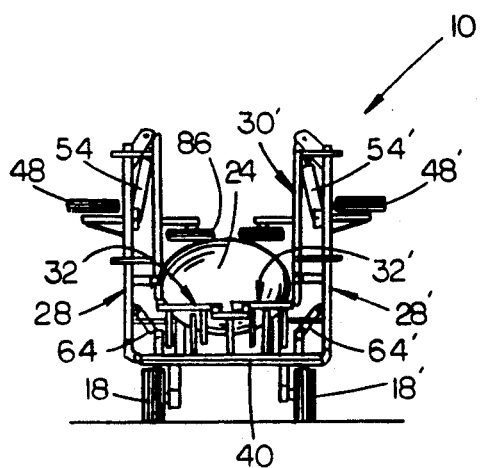
FIG. 5 is a view similar to FIGS. 3 and 4 except that the sprayer is in its transport position.
Figure 6:
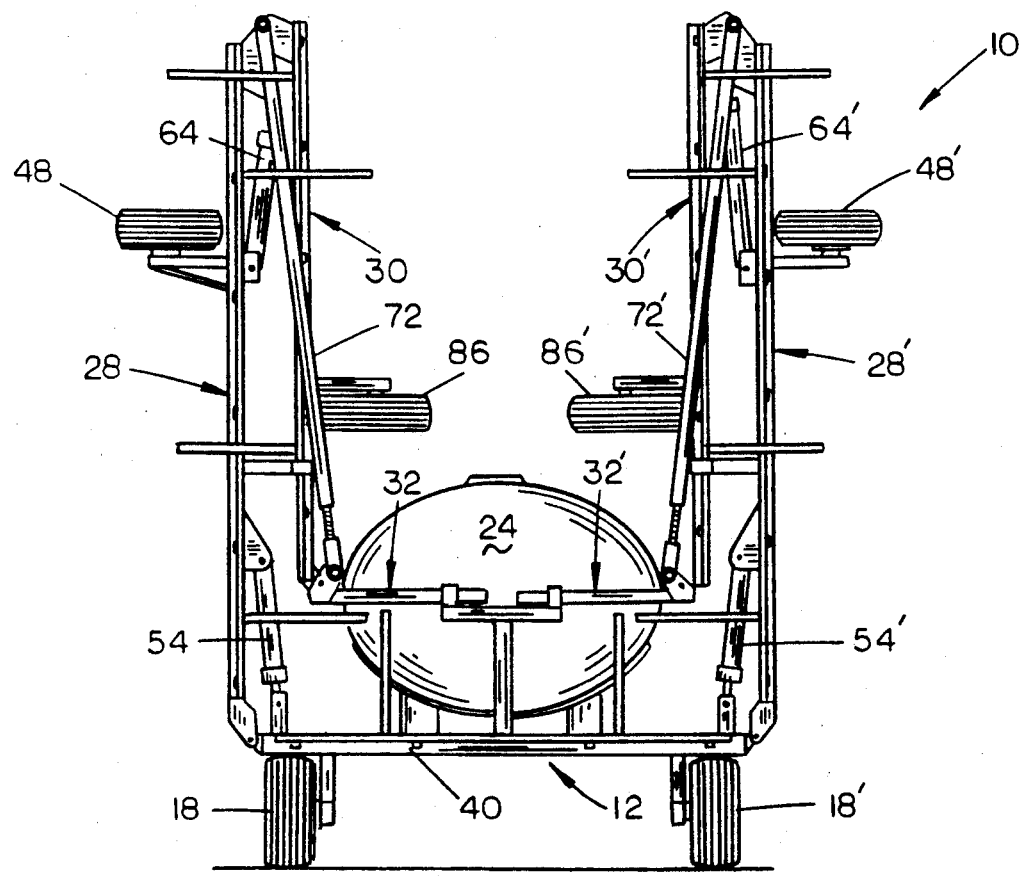
FIG. 6 is a larger view of FIG. 5.

When intermediate boom sections 30 and 30' have been positioned on top of inner boom sections 28 and 28', hydraulic cylinders 54 and 54' are actuated to cause the retraction of the rods therein so that the inner boom sections 28 and 28' will be moved from their horizontally disposed field position to the vertically disposed transport position illustrated in FIG. 5. When the sprayer of this invention is positioned in the transport position of FIGS. 5 and 6, the sprayer will have a width such that it may pass through door openings or the like.

More importantly, the sprayer, although having a large width for field use, will have a relatively short heighth when in the transport position so that the sprayer may pass through door openings. The reduced heighth is primarily made possible by the automatic folding of the outer boom sections 32 and 32' as described.

Thus, it can be seen that the invention accomplishes at least all of its stated objectives.

I claim:

1. A folding agricultural sprayer, comprising,
a wheeled frame means having rearward and forward ends, and opposite sides, said wheeled frame means having a spray tank mounted thereon, hitch means at the forward end of said wheeled frame means for connection to a prime mover,
first and second boom assemblies mounted at the opposite sides of said wheeled frame means and normally extending substantially horizontally laterally outwardly therefrom,
each of said first and second boom assemblies comprising inner, intermediate and outer boom sections having inner and outer ends,
the inner end of each of said inner boom sections being selectively pivotally secured, about a horizontal axis, to one side of said wheeled frame means whereby said inner boom section may be selectively moved approximately 90° from a horizontal field position to a verticlly disposed transport position,
the inner end of each of said intermediate boom sections being selectively pivotally secured, about a horizontal axis, to the outer end of the associated inner boom section whereby said intermediate boom section may be selectively moved approximately 180° from a horizontal field position to a horizontal transport position wherein said intermediate boom section overlies the associated inner boom section,
the inner end of each of said outer boom sections being selectively pivotally secured, about a horizontal axis, to the outer end of the associated intermediate boom section whereby said outer boom section may be pivotally moved from a substantially horizontal field position approximately 90°, with respect to the associated intermediate boom section, whereby said outer boom section will extend horizontally inwardly toward the center of said wheeled frame means when said intermediate boom section has been moved to its transport position and said inner boom member has been moved to its transport position.

2. The sprayer of claim 1 wherein a hydraulic cylinder means connects each of the inner boom sections with said wheeled frame means for moving said inner boom section between its field and transport positions.

3. The sprayer of claim 2 wherein a hydraulic cylinder means connects each of the intermediate boom sections with the associated inner boom section for moving said intermediate boom section between its field and transport positions.

4. The sprayer of claim 3 wherein a linkage means is operatively connected to each of said outer boom sections for automatically moving said outer boom section to its transport position as the associated intermediate boom section is moved to its transport position.

* * * * *